United States Patent [19]
Rohrbach et al.

[11] Patent Number: 5,759,394
[45] Date of Patent: Jun. 2, 1998

[54] ELONGATE FIBER FILTER MECHANICALLY SECURING SOLID ADSORBENT PARTICLES BETWEEN ADJACENT MULTILOBES

[75] Inventors: Ronald P. Rohrbach, Flemington Hunterdon, N.J.; Gordon W. Jones, Toledo, Ohio; Peter D. Unger, Convent Station, N.J.; Daniel Bause, Flanders, N.J.; Lixin Xue, Morristown, N.J.; Russell Dondero, North Arlington, N.J.

[73] Assignee: AlliedSignal Inc., Morristown, N.J.

[21] Appl. No.: 757,984

[22] Filed: Nov. 27, 1996

[51] Int. Cl.⁶ .................. B01D 39/04; B01D 39/16
[52] U.S. Cl. .................. 210/264; 210/287; 210/435; 210/502.1; 55/527; 55/529; 55/DIG. 39; 428/368; 428/372
[58] Field of Search .................. 428/362, 372, 428/368; 264/204, 184, 205, 210.6, 288.4, 290.5, 331.19, 177.13, 177.1; 210/243, 510.1, 505, 500.23, 502.1, 264, 503, 287, 435; 55/528, DIG. 39, 516, 524, 527, 529; 96/99

[56] References Cited

U.S. PATENT DOCUMENTS

| | | | |
|---|---|---|---|
| Re. 35,062 | 10/1995 | Brostrom et al. | 55/DIG. 35 |
| 4,130,487 | 12/1978 | Hunter et al. | 210/508 |
| 4,242,382 | 12/1980 | Ellis et al. | 428/372 |
| 4,255,487 | 3/1981 | Sanders | 428/368 |
| 4,759,986 | 7/1988 | Marikar et al. | 210/500.23 |
| 4,908,052 | 3/1990 | Largman et al. | 55/486 |
| 5,057,368 | 10/1991 | Largman et al. | 428/397 |
| 5,590,459 | 1/1997 | Powers et al. | 210/500.1 |
| 5,597,645 | 1/1997 | Pike et al. | 55/528 |
| 5,662,852 | 9/1997 | Kampschulte et al. | 264/204 |

*Primary Examiner*—W. L. Walker
*Attorney, Agent, or Firm*—Howard G. Massung

[57] ABSTRACT

An air filtration or fluid treatment system includes a non-woven filter media or mat (10) formed from a plurality of elongated generally hollow fibers (20) each having an internal cavity (22) which has an opening (24) to the fiber surface and each retaining within the internal cavity a large number of relatively small solid particles (18) which interact with the air or other fluid stream to be treated. The solid adsorbent particles (18), such as activated carbon, are permanently entrapped within the longitudinal cavities (22) of the fibers (20) without the use of an adhesive or without being embedded onto or within the polymer fiber.

11 Claims, 3 Drawing Sheets

ELONGATE FIBER FILTER MECHANICALLY SECURING SOLID ADSORBENT PARTICLES BETWEEN ADJACENT MULTILOBES

BACKGROUND OF THE INVENTION

1. Field of the Invention

This invention relates to a filter system and more particularly to a system utilizing a solid adsorbent, such as active carbon particles.

2. Description of Prior Art

It is known in the prior art to use activated charcoal or a zeolite material as an adsorptive odor removing element or media to purify an air stream. U.S. Pat. No. 4,130,487 shows a filter for liquid or gases which includes activated carbon for removing odors during air filtration. The activated carbon is in an additional layer which is added to the filter material.

Prior art filters have used the surface coating of a filter media with coarse granular carbon particles and have also used carbon fibers. The carbon fibers are formed from organic polymer fibers which are heated and carbonized. The ability to coat various powdered particulate material on a surface of a fiber or other item has required an adhesive layer to be used to immobilize and hold the powder particles on the surface. The very act of using an adhesive to hold the particles results in a portion of the surface of the powder particles being contaminated by the adhesive and therefore becoming ineffective for filtration. A balance has to be met between the strength of the immobilization versus the maintaining of effectiveness of the powder layer. In order to minimize this contamination larger particles are often used so that the point of contact between the surface adhesive and powder particles is small. In typical gaseous applications using activated carbon the particles used are frequently 100 microns and larger; and, finely powdered activated carbon is basically only used in liquid decolorization applications despite the fact that fine powder activated carbon holds the potential of much more rapid kinetics.

SUMMARY OF THE INVENTION

The present invention provides a filter wherein a solid adsorbent, such as an activated carbon powder, is entrapped, without the use of an adhesive, within longitudinal cavities formed in each of the fibers in a fiber filter media or mat. The solid adsorbent in such an application retains virtually the same adsorption capability or capacity as it had in the original virgin stock. This is contrary to adhesive retention of carbon particles wherein the particles retain only a fraction of their original capacity. The fibers have longitudinal extending internal cavities which have openings extending to the outer surface of the fibers. These fibers provide a way to mechanically immobilize powdered activated carbon adsorbent particles without the use of an adhesive. The fiber, the opening size and the particles to be entrapped are selected so that when the particles are forced into the longitudinal cavities they are permanently retained. The activated carbon powder becomes mechanically trapped within the longitudinal cavities of the fibers and is basically irreversible bound. This approach can be extended to any powder which one would like to entrap within a fiber medium, including such agents as zeolites, baking soda, cyclodextrins or any solid which has some property to either adsorb certain gases of interest or release agents into a fluid stream.

This invention provides a filter media material comprising flexible fibers, each having a cross section with internal cavities. The internal cavities extend longitudinal along the lengthwise direction of the fiber and they are filled with a solid particulate material which can adsorb unwanted molecules. The filter mat of the present invention should have a significant cost savings over filters using carbon fibers and should outperform filters using granular activated carbon coatings.

BRIEF DESCRIPTION OF DRAWINGS

For a better understanding of the invention reference may be had to the preferred embodiments exemplary of the inventions shown in the accompanying drawings in which.

DETAILED DESCRIPTION OF THE PREFERRED EMBODIMENTS

Figure 1:
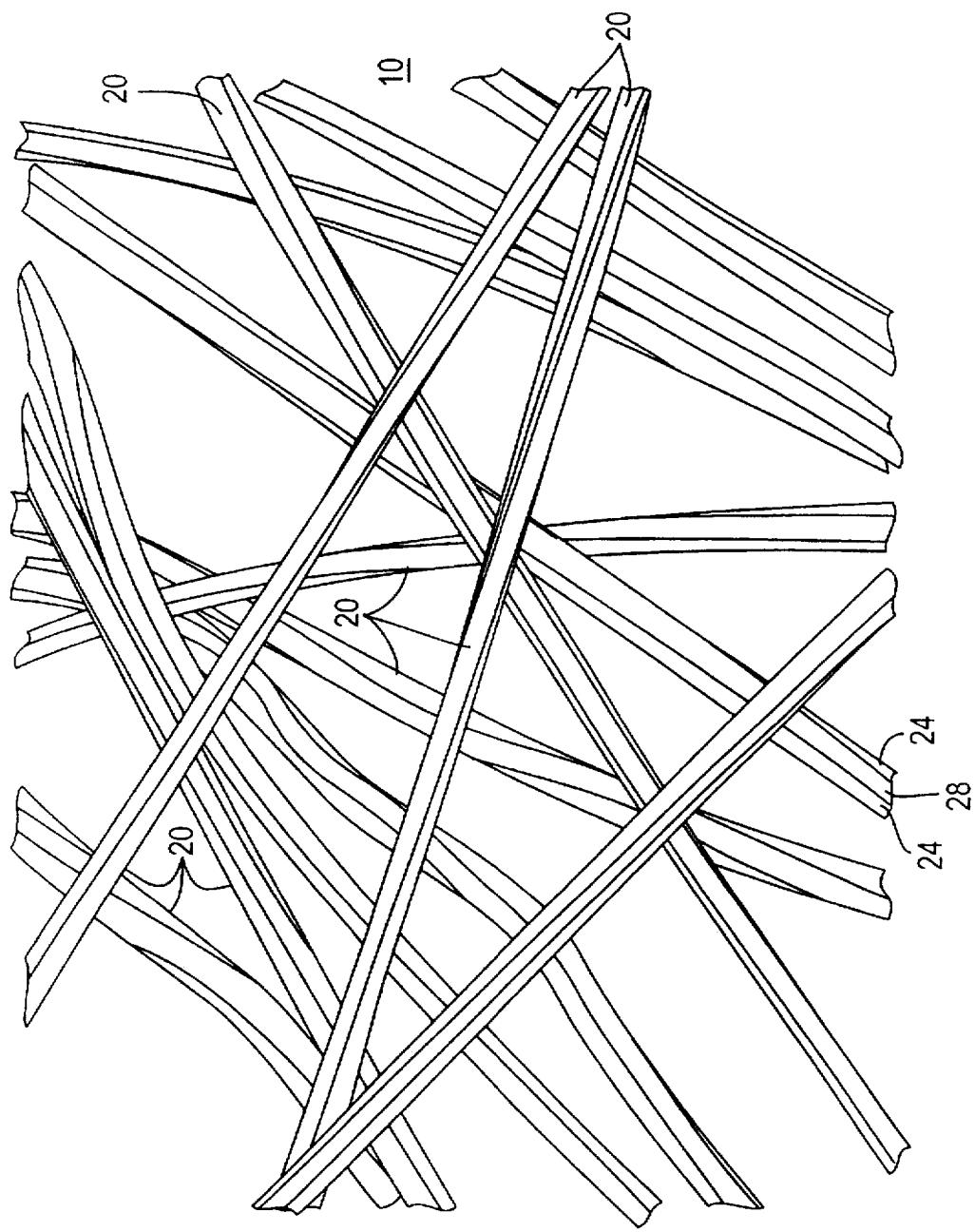
FIG. 1 is an illustration of a portion of a nonwoven fiber mat utilizing fibers containing carbon particles according to the present invention.
Figure 2:
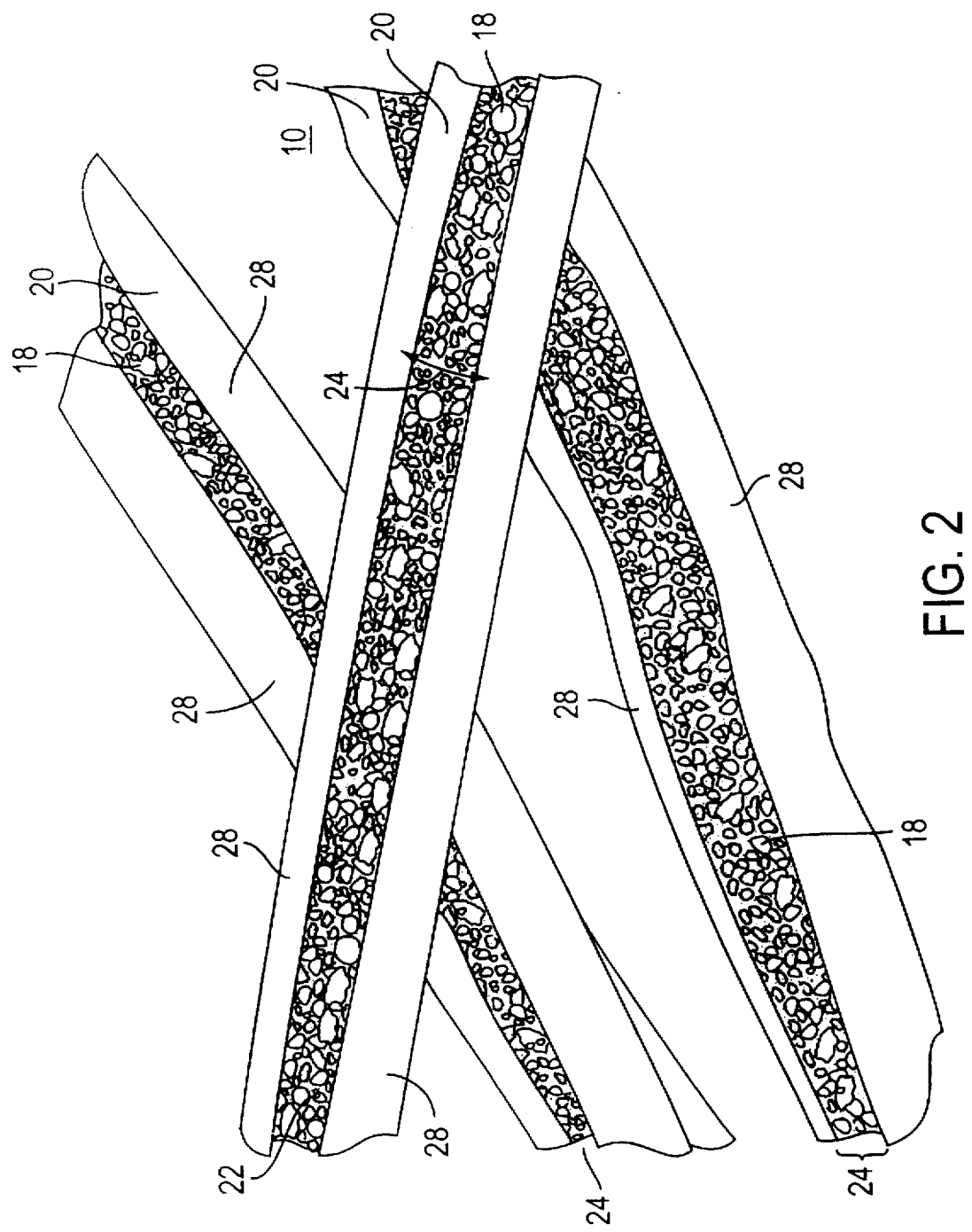
FIG. 2 is an enlarger view of a portion of the fiber mat shown in FIG. 1 utilizing fibers according to the present invention.

Referring now to the drawings and FIGS. 1 and 2 in particular there is shown a nonwoven fiber mat 10 filter formed from a plurality of flexible fibers 20. Each fiber 20 includes an internal cavity 22 within which are disposed small dry active carbon particles 18. A longitudinal opening 24 extends from each cavity 22 to the surface of each fiber 20. The multilobal fibers 20 are relatively small having a diameter of 10 to 250 microns or smaller. The size of opening 24 is selected so when particles 18 are disposed in cavity 22 they are generally permanently entrapped and cannot easily be removed. The active carbon particles are selected to be substantially smaller than opening 24 and generally are very small being less than 10 microns across.

The small particles carbon particles 18 become mechanically entrapped and remain within the fiber cavities 22 and generally do not enter the space between the fibers 20; yet, through the longitudinal openings 24 the particles 18 are in communication with the air stream flowing past the generally hollow fibers 20.

The gas adsorbing active carbon particles 18 which have an affinity for the undesired gases to be removed from the air stream are selected and disposed within the internal channels or cavities 22 formed in the individual generally hollow fibers 20. The dry particles selected use adsorption rather than absorption as the mechanism to decontaminate or purify the air stream. The particles 18 used are selected to adsorb the vapors of interest, to be non hazardous and to neutralize specific gases and odor vapors.

Figure 4:
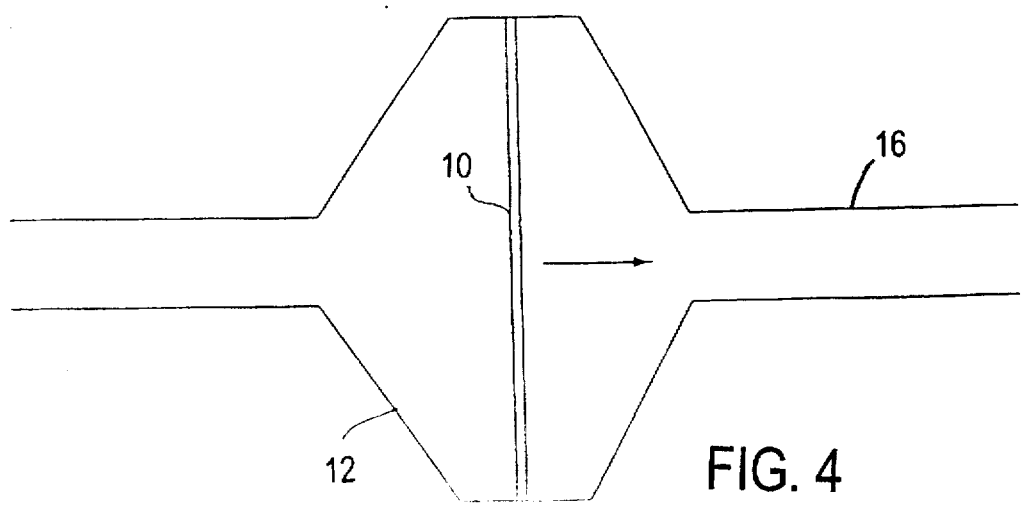

The fiber filter mat 10 can be used in an air filtration or odor removal system as illustrated in the simplified diagram of FIG. 4. The filter system has a housing 12 with an air inlet 14 and an air outlet 16. The fiber mat 10 is disposed across the housing so the air stream entering through inlet 14 must flow through the fiber mat 10 to reach the outlet 16. A mechanical device such as a fan can be used to assist with the air flow. The air filtration system can be constructed so the fiber filter mat 10 can be easily removed and replaced.

Figure 3:
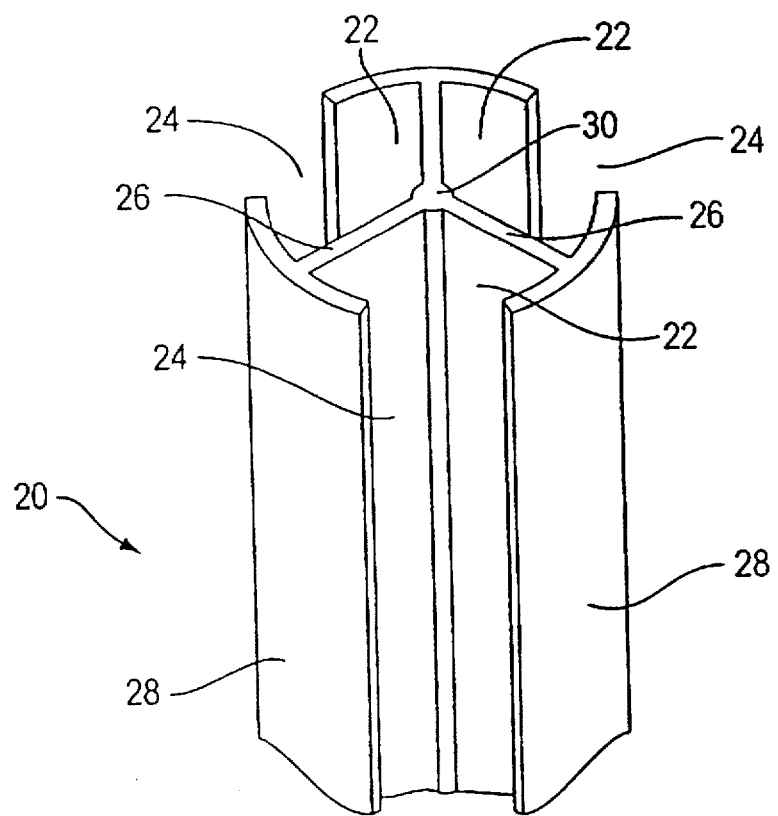
FIG. 3 is a perspective view showing a fiber which is suitable for practicing the present invention; and, FIG. 4 is simplified view of a filtration system using a fiber filter mat according to the present invention.

A generally hollow fiber 20 which is particularly suitable for practicing this invention is disclosed in U.S. Pat. No. 5,057,368 and shown in FIG. 3. This patent discloses a trilobal or quadrilobal fiber formed from thermoplastic polymers wherein the fiber has a cross-section with a central core and three or four T-shaped lobes 26. The legs of the lobes intersect at the core 30 so that the angle between the legs of adjacent lobes is from about 80 degrees to 130 degrees. The thermoplastic polymer is typically a polyamide, a polyester, a polyolefin or a combination thereof. The fiber 20 as illustrated in FIG. 3 is formed as an extruded strand having three hollow interior longitudinally extending cavities 22 each of which communicates with the outer strand surface by way of longitudinal extending slots 24 which are defined between the outer ends of the T-shaped lobes.

As can be clearly seen in FIGS. 1 and 2 the active carbon particles 18 are retained within the individual cavities 22 without spilling out into the inter fiber voids. The fibers 20 strongly retain the active carbon particles 18 within the cavities 22 so that the particles 18 will not shake off and the fiber mat 10 retains the particles 18 when touched or handled. In a filter mat 10 of such fibers 20 the area between the individual strands remains relatively free of the gas adsorbing active carbon particles 18 with which the internal cavities 22 of each fiber 20 are filled. The filter mat 10 fibers may be made of one or more types of material such as polyamides, polyesters, or polyolefins. The three T-Shaped cross-section segments may have their outer surface 28 curved, as shown, or the outer surface may also be straight. While the fiber 20 is depicted as three lobed other number of lobes are suitable. In addition other external or internal fibers with C-shapes or other cross sections may also be suitable for retaining the small gas adsorbing particles 18 provided the opening from the cavity is sized to retain the particles 18 within the fiber interior 22.

In forming the fiber mat 10, the solid particles are aggressively rubbed into the fibers 20. The procedure used for dry impregnation is to take the fibers 20 and liberally dust them with the adsorbent powder. The particles 18 of the adsorbent powder have a diameter of less the one half the fiber 20 cross sectional diameter. The powder particles 18 are rolled into the fiber 20 several times. The excess powder is physically removed by agitation aided by a strong air flow. The powder particles 18 which remain within the cavities 22 are surprisingly stable and resistant to physical action. We believe it is a keystone type mechanical entrapment which tenaciously holds the particles 18 within the cavities 22. The particles 18 seem to engage one another and do not spill from the cavities 22 through opening 24. We tried impregnating trilobal fiber in which the outer ends or caps of the lobes 26 were removed. Very little carbon particles were retained by such fibers.

In order to determine the cause of the forces responsible for this surprisingly strong interaction between the fibers 20 and the fine powder particles 18 we attempted to reduce the electrostatic bonding forces, if any, which might have caused this tenacious agglomeration. We first subjected the impregnated carbon fibers to 100% relative humidity and directed 40 meters per minute of air over the fibers 20 and collected any off dust. We found undetectable amounts. We further took the fiber filter mat 10 and submerged it into room temperature water with agitation and found the carbon particles 18 still remained securely in place. Then we took the filter fiber mat 10 and added detergent to the water with agitation and found no further loss. Additionally the carbon impregnated fibers 20 withstood both an alcohol and acetone wash without loss of carbon particles 18. These tests clearly indicate that the forces responsible for this interaction are non electrostatic in nature and suggest a mechanical entrapment. These tests also indicate the fibers 20 impregnated with activated carbon or other particles might have applications for various fluid media including gas and liquids.

The disclosed approach can be extended to any powder which one would like to entrap within a fiber medium, including such agents as zeolites, baking soda, cyclodextrins or any number of other solid particle of interest. The fibers 20 have also been used to entrap particles of zinc oxide, zirconium oxide, silica, alumina in various phases, clays including kaolin and bentonite. In the fibers 20 shown in FIGS. 1 and 2 the fiber diameter is around 30 microns. The size of the cavity 22 opening 24 is approximately 10 microns. The carbon particles are around 1 to 2 microns across and smaller.

The material described in this invention can be surface coated with virtually complete retention of the powder's properties and can be extended to be used with extremely fine powders. By so doing one can significantly improve the performance and efficiency of the powder. In the case of activated carbon, typical gaseous applications use granular carbon of 100 microns and larger and finely powdered activated carbon is basically only used in liquid decolorization applications despite the fact that powder activated carbon holds the potential of much more rapid kinetics. With this invention filters can be constructed utilizing finely powdered activated carbon for gas phase applications. Additionally, this invention can also be used for liquid based applications.

Basically this invention provides a simplified and low cost version of a filter mat using carbon fiber elements. Instead of forming the carbon filter fibers by starting with an organic polymer which is then heated and carbonized we start with a generally hollow fiber and impregnate it with powdered carbon. A few other examples of filter applications for this invention are: an odor control carbon filter; a zeolite coated odor control filter; and a metal sequestering water filter. This invention might also be used for removal of organic water pollutants from contaminated water supplies.

We claim:

1. Apparatus for removing molecules from a fluid stream comprising:
   a plurality of elongated fibers each having multiple lobes with a longitudinally extending internal cavity including an opening from the internal cavity to the outer fiber surface formed between adjacent lobes;
   a fine powder, made from particles which can adsorb the molecules, disposed within the internal cavities of said plurality of elongated fibers;
   a flow path for the fluid stream, containing the molecules to be removed, directed over a portion of said plurality of elongated fibers whereby the molecules to be removed are adsorbed by said fine powder; and,
   said fine powder particles being of such a size, shape and makeup that they are securely retained mechanically within the internal cavities.

2. Apparatus as claimed in claim 1 wherein each elongated fiber is less than 250 microns in diameter and the majority of fine powder particles are less than 20 microns in size.

3. Apparatus as claimed in claim 1 wherein the fine powder particles are activated carbon and the fluid stream is air.

4. Apparatus as claimed in claim 1 wherein each lobe has a generally T-shaped cross section.

5. A filter for removing selected types of molecules comprising:
   a plurality of elongated multilobal flexible fibers, each having at least one elongated open channel formed between adjacent lobes and extending into the interior of the fiber, disposed to form a nonwoven fiber filter mat; and, a plurality of solid particles which have an affinity for the selected type of molecules disposed and held mechanically within the channels for adsorbing the selected type of molecules as they pass through the filter.

6. A filter as claimed in claim 5 wherein the diameter of each elongated fiber is less than 250 microns and the average diameter of said plurality of solid particles is less than 10 microns.

7. A filter as claimed in claim 5 wherein each fiber includes a plurality of elongated open channels within which the plurality of solid particles which can adsorb the selected types of molecules are disposed.

8. A filter as claimed in claim 7 wherein the fibers are disposed in generally a parallel alignment in the nonwoven fiber filter mat.

9. A filter as claimed in claim 7 wherein the fibers are disposed in the nonwoven fiber filter mat in an orientation which is not parallel.

10. An air filtration system for removing gas phase contaminants comprising:

a plurality of multilobal fibers each having at least one longitudinally extending open channel projecting into the interior of the fiber, a plurality of small solid particles which can adsorb the gas phase contaminants disposed and mechanically held within the open channels in said plurality of fibers, and an air flow path containing the gas phase contaminants directed over a portion of said plurality of fibers whereby said plurality of small solid particles disposed in the open channels communicates with the air flow path and adsorbs the gas phase contaminants.

11. Apparatus as claimed in claim 10 wherein the fine powder particles are activated carbon and the fluid stream is air and each fiber includes a plurality of longitudinally extending open channels projection into the fiber interior.

* * * * *